United States Patent
Jacobs et al.

(10) Patent No.: US 9,602,187 B2
(45) Date of Patent: Mar. 21, 2017

(54) AIRCRAFT FLIGHT DATA DELIVERY AND MANAGEMENT SYSTEM WITH EMERGENCY MODE

(75) Inventors: Kent Jacobs, Calgary (CA); Murat Sumer, Calgary (CA); Matthew Bradley, Calgary (CA); Richard Hayden, Sudbury, MA (US); Alana MacKinnon, Calgary (CA); Zeynin Juma, Calgary (CA)

(73) Assignee: Flyht Aerospace Solutions Ltd., Calgary, Alberta (CA)

( * ) Notice: Subject to any disclaimer, the term of this patent is extended or adjusted under 35 U.S.C. 154(b) by 0 days.

(21) Appl. No.: 13/387,011

(22) PCT Filed: Aug. 11, 2010

(86) PCT No.: PCT/CA2010/001247
§ 371 (c)(1),
(2), (4) Date: Apr. 11, 2012

(87) PCT Pub. No.: WO2011/017812
PCT Pub. Date: Feb. 17, 2011

(65) Prior Publication Data
US 2012/0191273 A1 Jul. 26, 2012

Related U.S. Application Data

(60) Provisional application No. 61/232,876, filed on Aug. 11, 2009.

(51) Int. Cl.
*B64D 43/00* (2006.01)
*H04B 7/185* (2006.01)
(Continued)

(52) U.S. Cl.
CPC . *H04B 7/18508* (2013.01); *B64D 2045/0045* (2013.01); *G07C 5/008* (2013.01)

(58) Field of Classification Search
CPC ............ B64D 45/00; B64D 2045/0045; G08G 5/0021; G05D 1/101; G05D 1/0202;
(Continued)

(56) References Cited

U.S. PATENT DOCUMENTS

| | | | | |
|---|---|---|---|---|
| 4,644,494 A | * | 2/1987 | Muller | ................... G11C 16/06 711/152 |
| 5,574,648 A | | 11/1996 | Pilley | |

(Continued)

FOREIGN PATENT DOCUMENTS

| | | |
|---|---|---|
| CN | 2003801085859 | 4/2011 |
| EP | 1563616 | 2/2011 |

(Continued)

OTHER PUBLICATIONS

Michael D. Sudolsky, The Boeing Company, ARINC 573/717, 767 and 647A: The Logical Choice for Maintenance Recording and IVHM Interface Control or Frame Updates , 2009, Annual Conference of the Prognostics and Health Management Society, 2009, pp. 1-11.*

(Continued)

*Primary Examiner* — Tuan C. To
(74) *Attorney, Agent, or Firm* — Bennett Jones LLP

(57) ABSTRACT

An automated aircraft flight data and delivery management system and method operates in a normal state and a demand state. The demand state may be self-initiated or manually-initiated, and may be triggered during situations which include but are not limited to situations when the aircraft is in a potential or confirmed emergency situation. Data transmission increases in intensity when the system is in a demand state.

17 Claims, 10 Drawing Sheets

(51) Int. Cl.
*B64D 45/00* (2006.01)
*G07C 5/00* (2006.01)

(58) Field of Classification Search
CPC .... H04B 7/18508; H04B 7/185; G07C 5/008;
B64C 19/00; H04L 67/12
USPC .......................................................... 701/3
See application file for complete search history.

(56) References Cited

U.S. PATENT DOCUMENTS

| | | | |
|---|---|---|---|
| 5,890,079 A | 3/1999 | Levine | |
| 5,974,349 A | 10/1999 | Levine | |
| 6,047,165 A | 4/2000 | Wright et al. | |
| 6,092,008 A * | 7/2000 | Bateman | G07C 5/008 244/1 R |
| 6,104,914 A | 8/2000 | Wright et al. | |
| 6,108,523 A | 8/2000 | Wright et al. | |
| 6,148,179 A * | 11/2000 | Wright | G08G 5/0013 340/531 |
| 6,154,636 A | 11/2000 | Wright et al. | |
| 6,154,637 A | 11/2000 | Wright et al. | |
| 6,160,998 A | 12/2000 | Wright et al. | |
| 6,163,681 A | 12/2000 | Wright et al. | |
| 6,167,238 A | 12/2000 | Wright | |
| 6,167,239 A | 12/2000 | Wright et al. | |
| 6,173,159 B1 * | 1/2001 | Wright | H04B 7/18506 340/3.5 |
| 6,181,990 B1 * | 1/2001 | Grabowsky | B64D 47/00 342/33 |
| 6,243,580 B1 * | 6/2001 | Garner | H04B 7/18539 455/12.1 |
| 6,249,913 B1 | 6/2001 | Galipeau et al. | |
| 6,278,913 B1 * | 8/2001 | Jiang | G07C 5/0858 244/158.1 |
| 6,308,044 B1 | 10/2001 | Wright et al. | |
| 6,308,045 B1 | 10/2001 | Wright et al. | |
| 6,463,383 B1 | 10/2002 | Baiada et al. | |
| 6,549,162 B1 * | 4/2003 | Gage | H04B 7/18508 342/353 |
| 6,567,729 B2 | 5/2003 | Betters et al. | |
| 6,735,505 B2 | 5/2004 | Levine | |
| 6,760,778 B1 * | 7/2004 | Nelson | H04B 7/18506 455/431 |
| 6,775,545 B2 | 8/2004 | Wright et al. | |
| 6,799,094 B1 * | 9/2004 | Vaida | B64D 45/0015 342/357.31 |
| 6,873,903 B2 | 3/2005 | Baiada et al. | |
| 6,963,292 B1 | 11/2005 | White | |
| 7,035,634 B2 | 4/2006 | Mead et al. | |
| 7,039,509 B2 | 5/2006 | Podowski | |
| 7,065,433 B2 | 6/2006 | Basu et al. | |
| 7,113,852 B2 | 9/2006 | Kapadia et al. | |
| 7,158,053 B2 * | 1/2007 | Crank | 340/963 |
| 7,203,630 B2 | 4/2007 | Kolb et al. | |
| RE40,479 E * | 9/2008 | Wright et al. | 455/98 |
| 7,426,387 B2 | 9/2008 | Wright et al. | |
| 7,620,374 B2 * | 11/2009 | Ziarno | H01Q 1/28 455/431 |
| 7,774,112 B2 * | 8/2010 | Nahapetian | 701/33.4 |
| 2003/0065428 A1 | 4/2003 | Mendelson et al. | |
| 2003/0130771 A1 * | 7/2003 | Crank | 701/4 |
| 2003/0225492 A1 * | 12/2003 | Cope | G07C 5/008 701/33.4 |
| 2004/0027255 A1 * | 2/2004 | Greenbaum | 340/945 |
| 2004/0186636 A1 | 9/2004 | Mendelson et al. | |

FOREIGN PATENT DOCUMENTS

| | | | |
|---|---|---|---|
| GB | 2285688 | 7/1995 | |
| GB | EP 1980489 A2 * | 10/2008 | ......... B64D 45/0015 |
| WO | WO 2008118206 A2 * | 10/2008 | ......... H04B 7/18506 |
| WO | 2011178912 | 2/2011 | |

OTHER PUBLICATIONS

SkyTrac Your Satcom Technology Partner; ISAT-200A System Specifications; pp. 1-2; www.skytrac.ca.
SkyTrac Your Satcom Technology Partner; SyyWeb & SkyWeb Mobile; pp. 1-2; www.skytrac.ca.
Stephens, Bob; Aeronautical Telecommunications Using IPv6; The Integrated Communications Navigation and Surveillance (ICNS) Conference; May 2003; pp. 1-46.
Descaillot. J.; Sita; The Sky is Not the Limit; AUTCOM Data Link; NASA Integrated CNS Technologies Conference and Workshop; May 1, 2002; pp. 1-26.
Roy, A; Secure Aircraft Communications Addressing and Reporting System (ACARS); IEEE 20th Conference of Digital Avionics Systems; Oct. 2001; pp. 7.A.2-1 to 7.A.2-11.
Adams, Charlotte.; ACARS on the Net; Avionics Magazine; Sep. 1, 2011; pp. 1-2.
Ramsey, James W.; Pulling Aircraft Diagnostics Together Digitally; Avionics Magazine; Apr. 1, 2001; pp. 1-4.
Dhas, C. et al.; Aeronautical Related Applications Using ATN and TCP/IP Research Report; NASA/CR—2000-209922; pp. 1-186.
Ohas C. et al.; Aeronautical Related Applications Using ATN and TCP/IP Research Report; NASA/CR 2000-209922; pp. 1-186; Apr. 2000.

* cited by examiner

Flight Data Report

| | | |
|---|---|---|
| Registration | C-TIME | |
| S/N | 100 | |
| Date | 14 September 2000 08:22:32 UTC | |
| Location | N 53 40 09  W 113 28 32 | |
| | | |
| Startup Location | N 51 06 50  W 114 01 13 | |
| Time at Startup | 07:15:08 UTC | |
| Time Airborne | 07:22:15 UTC | |
| Time Touchdown | 08:12:23 UTC | |
| Time at Shutdown | 08:22:12 UTC | |
| Shutdown Location | N 53 40 09  W 113 28 32 | |
| | | |
| Air Time | 00:50:08 | |
| Block Time | 01:06:57 | |
| | | |
| Block Fuel Usage | 826 lbs | |
| | | |
| APU Start Time | 07:02:14 UTC | |
| | 07:02:58 UTC | |
| APU Run Time | 00:15:43 | |
| | | |
| Engine Start Time | 07:17:14 UTC | 07:15:08 UTC |
| Engine Shutdown Time | 08:22:12 UTC | 08:22:11 UTC |
| Engine Elapsed Time | 01:04:58 | 01:06:57 |
| | | |
| Over Temperature | -- | -- |
| Over Torque | -- | -- |
| Reduced Power T/O | --% | --% |

FIG. 7

| Engine Trend Data Report | | |
|---|---|---|
| Registration | C-TIME | |
| S/N | 100 | |
| Date | 14 September 2000 08:22:32 UTC | |
| Location | N 53 40 09 W 113 28 32 | |
| | #1 | #2 |
| Altitude | 18,000 | 18,000 |
| Airspeed | 198 | 198 |
| Outside Air.Temp | -21°C | -21°C |
| Propeller.RPM | 1050 | 1050 |
| Propeller.Torque | 74% | 74% |
| $N_{HP}$ RPM | 29,887 | 29,967 |
| $N_{LP}$ RPM | 24,376 | 24,380 |
| ITT | 734°C | 742°C |
| Fuel Flow | 450 | 461 |

FIG. 8

AIRCRAFT FLIGHT DATA DELIVERY AND MANAGEMENT SYSTEM WITH EMERGENCY MODE

FIELD OF INVENTION

The present invention relates to an automated aircraft flight data and delivery management system and, more particularly, to a data acquisition, storage and transmission system that can operate in a self-initiated or manually-initiated demand mode during situations which include but are not limited to situations when the aircraft is in a potential or confirmed emergency situation.

BACKGROUND OF THE INVENTION

Modern aircraft are equipped with extensive sensing and self diagnostic capabilities that produce digital data and computer-generated messages that are used by the flight crew and the aircraft's flight and engine control systems to operate the aircraft. This data is also useful for post-flight analysis and is therefore stored on electronic devices commonly referred to as Flight Data Recorders (FDRs), including a category of FDR called the quick access recorder (QAR).

Most commercial aircraft and many military aircraft have a regulatory requirement to record flight data on a Flight Data Recorder (FDR). The flight data stored in the FDR can be used to retrospectively evaluate flight operations and also try to determine the cause of an abnormal flight condition or an accident. In all cases, the retrieval of stored FDR data occurs only after the completion of a flight by means of a physical connection to or removal of recording media from the FDR (or QAR), or short range wireless data transmission. When an accident occurs, an investigation team attempts to recover the FDR and analyze the flight data stored in the FDR. The data recorded to the FDR is meant to be sufficient to allow recreation of the events that preceded the accident. However, in some cases, the FDR may be physically damaged, causing the recorded flight data to be irretrievable from the FDR. If the aircraft has crashed in an inaccessible location, such as in a large body of water or in a remote land region, or if the aircraft has disintegrated during the crash, the physical FDR may not be locatable or retrievable. If the FDR has been damaged to the extent that flight data cannot be retrieved from the FDR, or if the FDR itself cannot be located, accident investigators are left with no flight data with which to understand the circumstances surrounding the accident.

Since the data stored on the physical FDR is only available after physically retrieving the device or its data storage elements after a flight, it is therefore of no value for analysis, associated crew guidance, and emergency response planning while the aircraft is still in flight.

In commonly owned U.S. Pat. No. 7,206,630, a flight data transmission system is described which allows for flight data acquisition in the ordinary course of events. Flight data is formatted and incorporated into an email, which is transmitted using a communication system, such as a satellite modem. There is no provision however for data accumulation and transmission in an emergency situation or where more detailed data related to specific time periods is desired.

SUMMARY OF THE INVENTION

It is to be understood that other aspects of the present invention will become readily apparent to those skilled in the art from the following detailed description, wherein various embodiments of the invention are shown and described by way of illustration.

In one aspect, the invention may comprise a method of transmitting flight data from an aircraft to a ground station server using an airborne data processing unit comprising data tables and instructions sets, the method comprising:
 (a) during operation in a normal state, obtaining and analyzing flight data from an aircraft and periodically generating and transmitting a summary file containing a summary of flight data to a ground station server; and
 (b) in response to a pre-defined triggering event, entering a demand state and obtaining flight data from the aircraft and periodically transmitting flight data to the ground station server, wherein the rate of data transmission is greater than in the normal state.

In one embodiment, the triggering event may be self-initiated, or the triggering event may be manually activated. In one embodiment, the method is automated. In one embodiment, in the demand state, the transmission of data is more frequent and/or more data is transmitted than in the normal state. In one embodiment, the data transmitted in the demand state is configured more efficiently to allow more data to be transmitted within a limited bandwidth usage, or to minimize bandwidth usage when transmitting larger amounts of data.

In another aspect, the invention may comprise an aircraft data transmission system for transmitting data to a ground server station, the system comprising an airborne data processing unit having:
 (a) a data acquisition module operative to obtain flight data from an aircraft;
 (b) a communication module operative to transmit data to the ground server station;
 (c) a memory comprising data tables and instructions sets;
 (d) a processing unit operatively connected to the data acquisition module, the communication module and the memory and operative in accordance with the instruction sets to:
  i. obtain, analyze and store flight data from an aircraft and periodically generate and transmit, using the communications module, a summary file containing a summary of the plurality of flight data to a ground station server, while in a normal state; and
  ii. in response to a pre-defined or user-initiated triggering event, automatically obtain flight data from the aircraft and periodically transmit, using the communication module, the flight data to the ground station server, while in a demand state;

In one embodiment, the system further comprises a compatible pre-programmed ground server station that receives and recognizes data transmission.

In yet another aspect, the invention may comprise a computer readable memory having thereon statements and instructions for execution by a data processing unit to carry out a method described herein.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein:

FIG. 7 is a sample flight data report;

FIG. 8 is a sample engine trend data report;

DESCRIPTION OF VARIOUS EMBODIMENTS

The detailed description set forth below in connection with the appended drawings is intended as a description of various embodiments of the present invention and is not intended to represent the only embodiments contemplated by the inventors. The detailed description includes specific details for the purpose of providing a comprehensive understanding of the present invention. However, it will be apparent to those skilled in the art that the present invention may be practiced without these specific details.

The present invention provides for aircraft data delivery and management system. In one embodiment, the system is fully automated and user-configurable. When describing the present invention, all terms not defined herein have their common art-recognized meanings.

As used herein, "flight data" means a representation of any operational or performance parameter or variable which may be sensed or recorded during the operation of an aircraft. Flight data may include, without limitation, date and time, location, pressure, altitude, airspeed or groundspeed, vertical acceleration, magnetic heading, control-column position, rudder-pedal position, control-wheel position, control surface positions and movements, fuel flow, fault messages generated by onboard systems, photographic images, and video or audio recordings. Flight data may also include derivatives and representations of flight data.

As used herein, "airborne system" or "airborne data processing unit" refers to an integrated avionics system, generally but not always contained in a single physical package, that contains electronic components and software for monitoring and acquisition (capture) of flight data, on board storage of flight data, selective processing of flight data, and a communications module for sending subsets of flight data and messages over a satellite communications link or other air-to-ground communications method, and receiving by such links messages, data, and other instructions from a ground-based server.

As used herein, "email" or "electronic mail" refers to discrete messages transmitted from one computing device to another by means of computer networks. Email may include attachments which may include simple text (ASCII) files or computer-readable files having other standard or proprietary formats. The structure and function of email clients and servers are well known in the art.

As used herein "SMS" refers to short message system, commonly referred to as "text messaging", which may be implemented over radio, cellular, landline and other networks.

Figure 1:
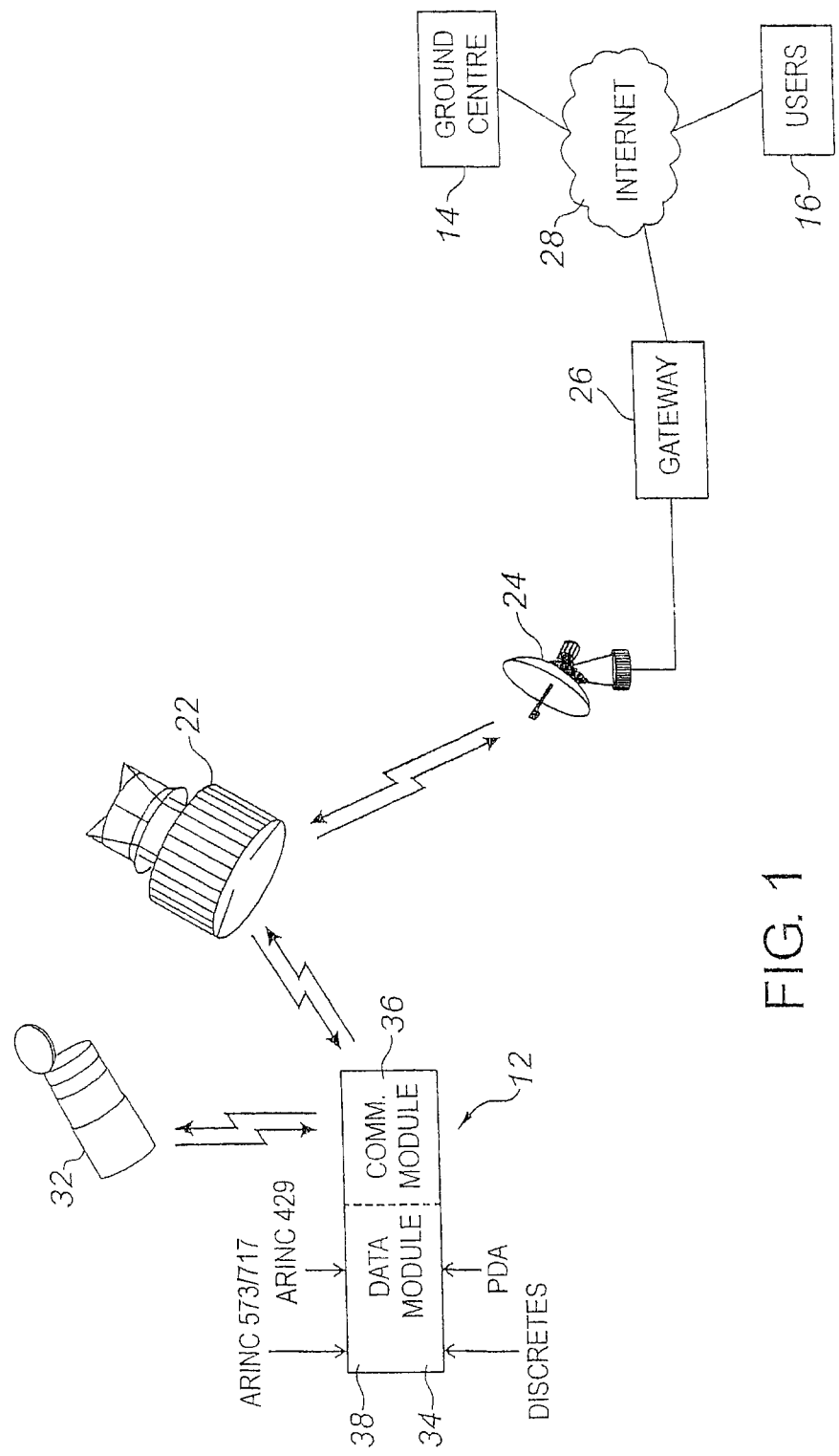
FIG. 1 is a schematic representation of a flight data acquisition, processing and communications system in a first embodiment.
Figure 2:
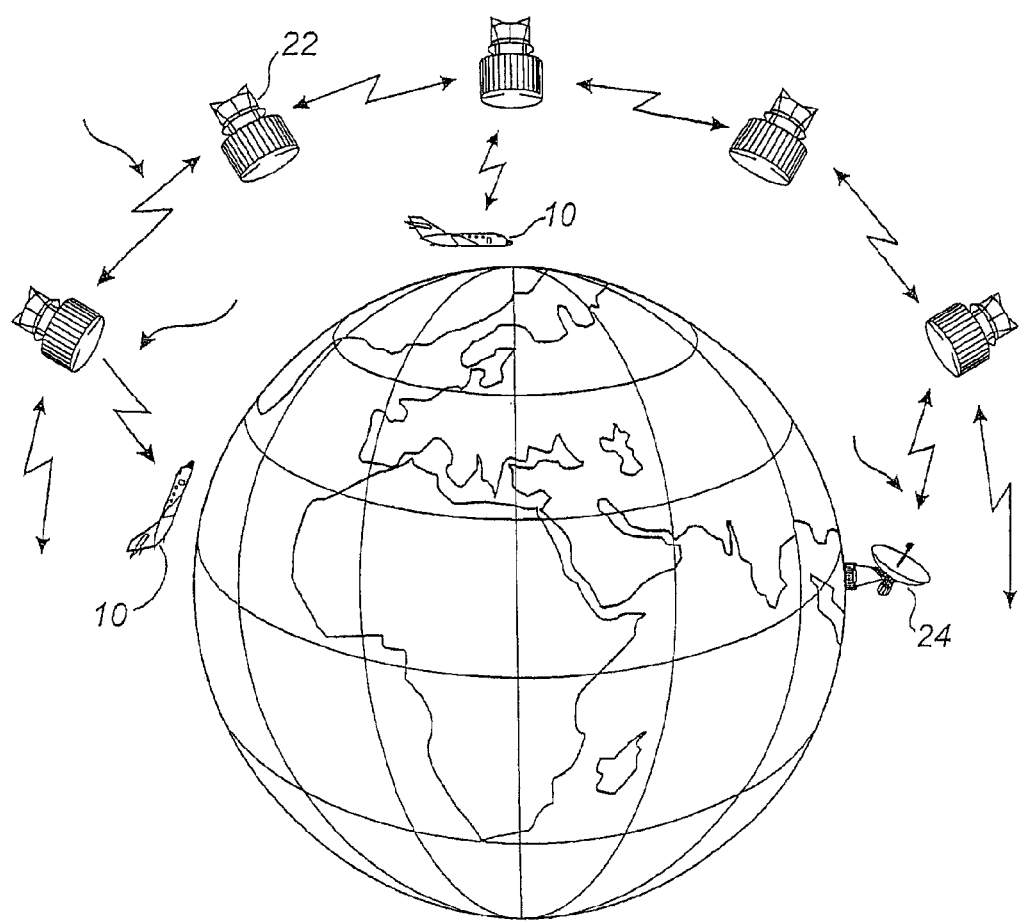
FIG. 2 is a schematic representation of a satellite network in one embodiment of the present invention.

In general terms, as shown in FIGS. 1 and 2, a system of the present invention includes an aircraft data processing unit (12) mounted in an aircraft (10). Also related to the system is a ground station server (14) which efficiently and securely communicates with the data processing unit (12) and which may also serve as an information portal, as well as at least one user workstation (16) which may be remotely located. In one embodiment, the ground station server (14) is coupled with the airborne data processing unit in a manner that ensures security of data transmission, increases efficiency of data transmission by reduction of message overhead, and verifies receipt of each transmission to increase overall system reliability.

The data processing unit (12) comprises data tables and instructions sets, and connects to various aircraft data buses and/or other data sources and accumulates flight data. Some or all of this flight data may be stored in parallel on a Flight Data Recorder in the aircraft (10) as is conventionally practiced in commercial aviation. The ground station server (14) receives and archives the flight data and preferably may automatically provide data reports to designated users of the system. An authorized user, through a workstation (16) with internet access, preferably a secure connection, may query the data using tools comprising data analysis software that would normally be included in the interface.

Further, an authorized user (16) may, with appropriate security measures being in place, send instructions to the airborne processing unit (12) to reconfigure the unit by modifying the data tables and/or instructions sets which govern the acquisition, processing, and transmission of raw data, processed data, or messages from other onboard systems. At no time, however, may a ground-based user send instructions to the airborne system that can relayed to other systems on the aircraft. In other words, the system will not allow a ground-based user to control or modify any aspect of the aircraft's operation or performance.

In one embodiment, as illustrated in FIGS. 1 and 2, the method of communication between the data processing unit (12) and the remote server (14) includes a satellite link system employing a satellite modem (18) included in a communications module (36) which is part of the data unit (12), a satellite network (22) made up of constellation of satellites, to a ground satellite receiver (24), which links to a gateway (26) and the Internet (28) or other computer network. The satellite constellation may comprise a plurality of geosynchronous satellites or low earth orbit satellites. In one embodiment, the satellite network (22) can be the Iridium™ system although any suitable satellite network could be used.

In one embodiment, multiple antennas are provided to provide adequate link to the selected communications network in any orientation of the aircraft. This may be important in situations where the aircraft is in a stable but unusual attitude, or is an unstable state.

In circumstances in which terrestrial ground receiving stations are within range of the aircraft, the communications module (36) may also include the appropriate radio (such as but not limited to VHF) and have the means to detect the availability of such communications channels and the embedded rules that may cause it to select such a channel for data communications.

Figure 3:
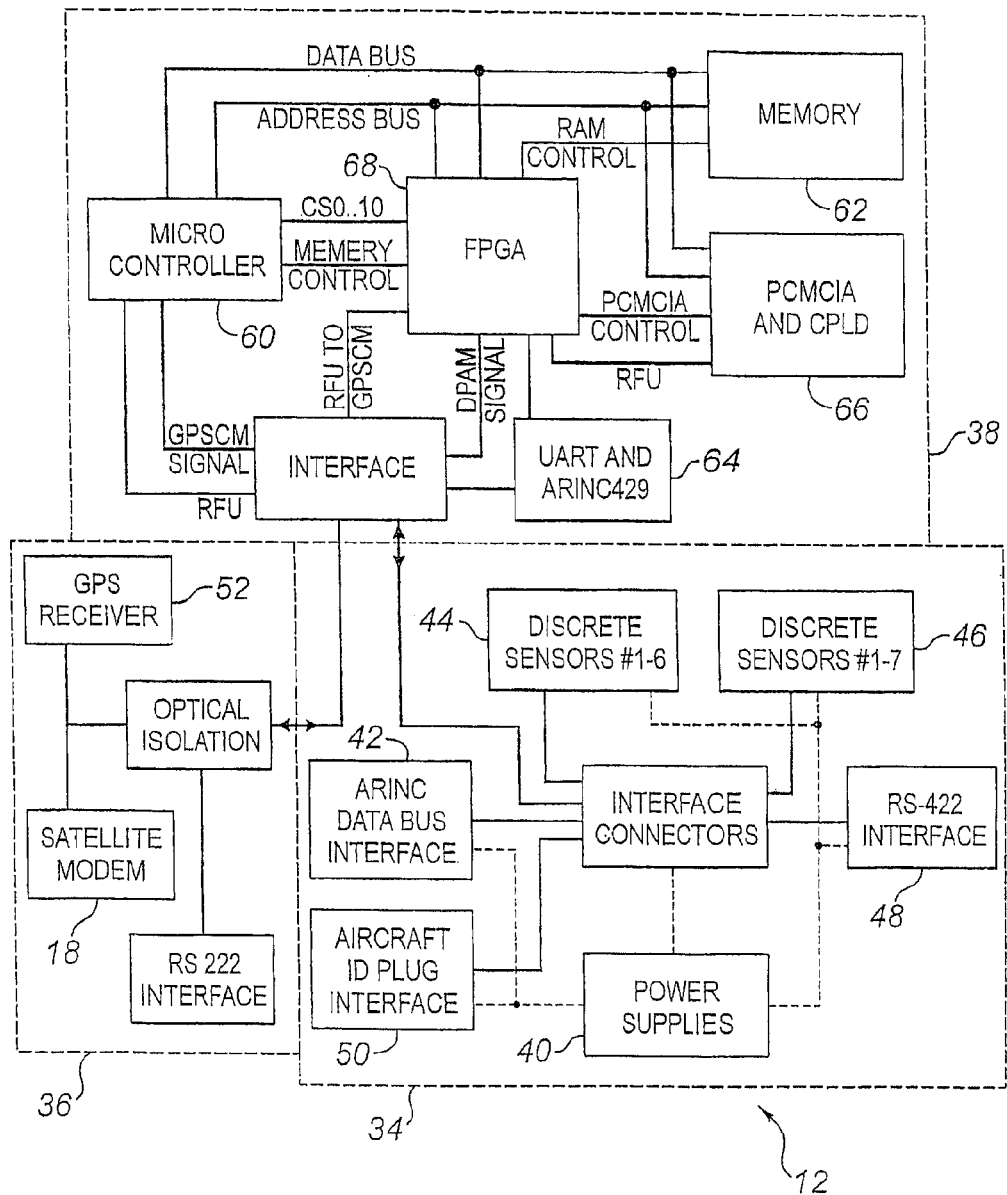
FIG. 3 is a block diagram of data processing using used in one embodiment of the flight data acquisition system.

As illustrated in FIG. 3, in one embodiment, a global positioning system (GPS) receiver (52) is included as part of the data processing unit (12). As is well known in the art, the GPS receiver (52) receives radio signals from GPS satellites (32) and calculates the position, altitude and speed of the aircraft (10).

In one embodiment, the data processing unit (12) includes three physical interconnected modules. A data acquisition module (34) is the primary interface to the aircraft systems and allows flight data to be obtained by the data processing unit (12), including all data being recorded to the Flight Data Recorder. A communication module (36) includes a communication device (18) such as satellite or cellular modem, and optionally other radio transceivers such as a VHF radio transceiver. A control module (38) controls the data acquisition module (34) and communication module (36) and processes and stores flight data to memory (62). The unit (12) also includes a power supply unit (40) which accepts aircraft power and, if necessary, transforms it to lower voltages to supply to the data acquisition unit's circuits.

In one embodiment, the power unit (40) is combined with the data acquisition module (34) and provides appropriate conditioned power to the components of the data processing unit (12). The power unit (40) may connect to any aircraft power bus (not shown). Optionally, a backup power input connected to the aircraft primary or emergency bus (not shown) can provide a backup power source in case the aircraft powers down during a data manipulation or transmission step. The second input may be configured to timeout after a set period of time to prevent draining the aircraft batteries. The data processing unit (12) could also be powered by a self-contained power source (not shown) independent from the electrical system of the aircraft (10) so as to allow continued and continuous operation of the system in the event of loss of aircraft power, which may occur during an emergency.

The data acquisition module (34) includes at least one data reader module (42) which interfaces to the aircraft's FDR bus. Preferably, the data reader module or modules (42) are capable of reading data in standard aviation formats such as ARINC 573 or 717 formats, and ARINC 429 used for communication between existing avionics units, which are well known in the art. Other data formats may be implemented such as military standards or proprietary formats. Additionally, the unit may include discrete input modules (44, 46) and an independent source of GPS data other than that serving the data bus. As used herein, a discrete input is any input from a source which is not part of an existing data bus. Examples of discrete input sensors (44, 46) may include manual triggered buttons or switches, cabin door switches, individual gauges or flight control transducers such as those detecting the lowering and raising of flaps. As well, a preferred embodiment may include a serial port interface (48) or a similar connection (such as Ethernet) to permit connection of a computing device such as a laptop computer, a handheld or tablet computer, electronic flight bag, etc. In one embodiment, a RS-422, or a RS 232, or a RS 422 with a RS 232 adapter interface and multiple Ethernet ports are provided to permit connection to another computing device. In addition, wireless personal area networks, such as Bluetooth™ or Zigbee™, may be used to provide connections between the unit (12) and other computing devices.

An aircraft identification module (50) provides an identifier signal which is unique to the aircraft. The identifier signal may include information regarding the manufacturer, model and series of the aircraft as well as a serial number or other information which identifies the specific aircraft involved.

The communication module (36), besides including a satellite modem (18) or other radio frequency communications device, may also include a GPS receiver (52) for use in instances where the aircraft does not have a GPS receiver, or to provide an independent source of GPS data in the event of a failure of the aircraft GPS receiver or loss of power on the data bus containing the GPS data. This self-contained GPS data source which may be supported by battery backup of the processor and communications module and can uniquely provide a continuous track and precise location of the aircraft in the event of an irrecoverable upset leading to a crash.

In one embodiment, the communication module incorporates a satellite modem (18) which includes a GPS receiver. Suitable satellite modems are commercially available. The specific mode of communication implemented by the communication module (36) is not essential to the present invention, although the implementation using Iridium™ provides global coverage for aircraft operating outside the geographic coverage limits of other satellite and line-of-sight radio communications systems and may therefore be a desirable implementation for communication.

The data acquisition module (34) and the communications module (36) both communicate with the data storage and control module (38) which serves as the primary controller for the data acquisition module (34). The data storage and control module (38) is configured to control and monitor the data acquisition module (34), perform any necessary computations or conversions, format data into reports, and store reports, processed data and raw data into memory. The data storage and control module further communicates with and controls the GPS and communications module (36), as described below, to process location information and transmit reports and data.

In one embodiment, data tables and logical processing instructions (instruction sets or ELAs) that operate on the onboard data, are both pre-programmed and reside in the data storage module (12) or in the non-volatile memory of the data processing module (12). The data tables and ELAs can be modified by an authorized user (16) through the ground station (14) by sending instructions for recording new, additional or different data parameters from aircraft data sources. Further, or alternatively, the authorized user may alter the method (logic) of processing or transmitting the aircraft data, or both. This remote reprogramming can be performed while the aircraft is flying, which may be especially beneficial for situations in which ground based personnel are assisting the crew with troubleshooting or when extensive data on a specific abnormal issue is desired. It is important to note that in the preferred embodiment, such access to data and logic tables must be restricted to the airborne data unit (12) and not allowed to go outside the unit to influence other systems on the aircraft.

In one embodiment shown in FIG. 3, a microprocessor subsystem includes a processing unit (60) with non-volatile read-only memory and random-access memory (62). A logic device (64) provides additional memory and a peripheral decoding circuit. Another logic device (66) provide buffering and connection to an external memory card, such as a Compact Flash™ memory or other similar memory media. A field programmable gate array (FPGA) (68) provides ARINC bus information decoding information for the processor (60). A maintenance access port (70) is an external serial interface used for software updates and data transfer. In one embodiment, the maintenance access port may include a standard RS 232 port as well as a port which is selectable between RS 232, RS 422 and RS 485 modes. A high speed protocol such as Ethernet may also be used.

The data storage and control module (38), or any of the data unit (12) modules, may be implemented by a general purpose computer programmed with appropriate software, firmware, a microprocessor or a plurality of microprocessors, programmable logic devices, or other hardware or combination of hardware and software known to those skilled in the art. The invention can also take the form of a computer readable memory, such as an optical disk (i.e. a DVD, CD-ROM, etc.), a hard disk, a portable memory device (i.e. a flash memory USB key, etc.), or other suitable computer readable memory having statements and instructions that can be used by a data processing unit (12), such as a general purpose computer to carry out the methods described herein. The block diagrams of the modules illustrated in FIG. 3 are examples of an embodiment of the invention and are not intended to be limiting of the claimed invention in any manner.

The data processing unit (12) is able to obtain flight data from the aircraft, as well as position information from the GPS receiver (52) and send this information in a data transmission or series of data transmissions to a satellite network (22) or other mode of air-to-ground data transmission. Typically, the data transmission takes the form of an email, SMS message, or a series of email or SMS messages. The data transmission from the data processing unit (12) to the satellite network (22) is transmitted from the satellite network (22) to the satellite ground earth station (24), and routed through a gateway (26) to the ground station server (14) over the Internet (28), a private computer network, a virtual private network (VPN) or over a public switched telephone network. When an alternative form of air-to-ground communication is available, such as VHF radio or Ku Band satcom, for example, the control module (38) may select the alternate mode as preferred routing of selected data for a certain period of time, the criteria for which can be programmed in advance.

Figure 4:
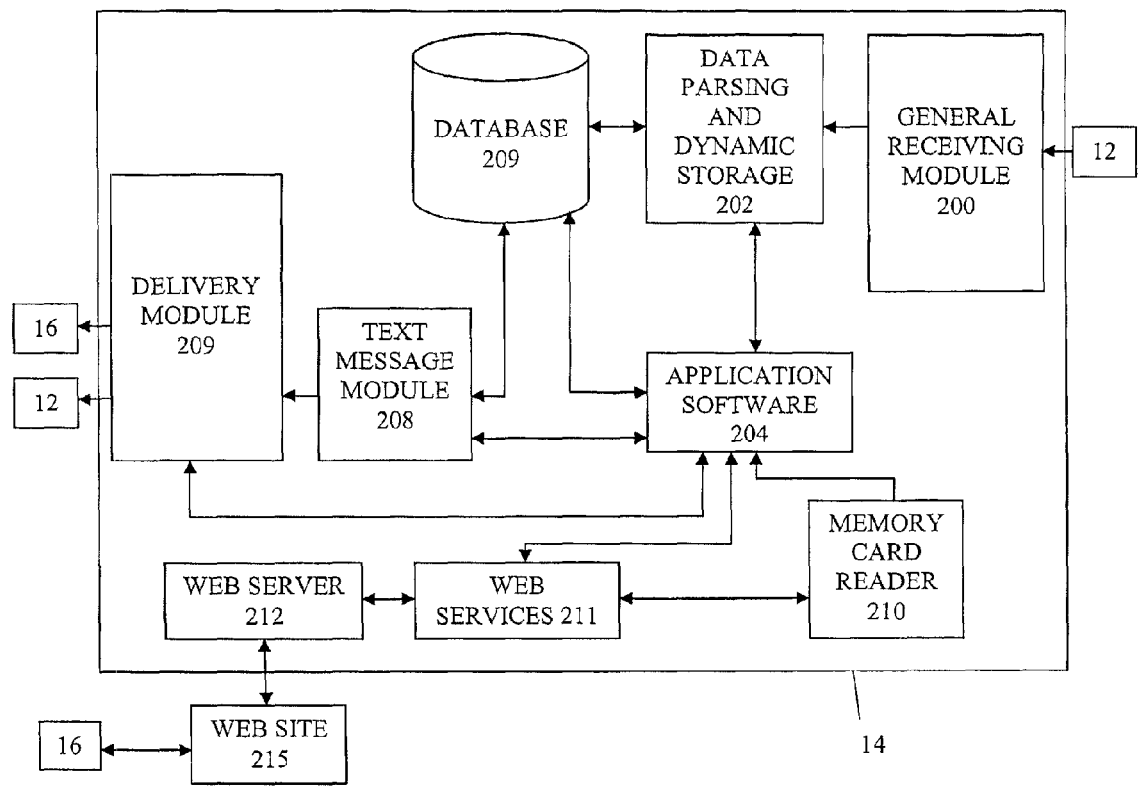
FIG. 4 is a block diagram of a ground server configuration used in one embodiment.

FIG. 4 illustrates a block diagram of a ground station server (14) in one embodiment of the invention. The ground station server (14) can include a number of modules, and even separate processors and computer devices, for receiving and managing information received from the data processing unit (12).

The data file transmission from the data processing unit (12) can be received through a general receiving module (200) and into the ground station server (14). The general receiving module (200) can be a thin interface allowing inputs to the ground based server (14) and can be used for receiving data from the data processing unit (12) through the ground satellite receiver (24) and gateway (26), as well as other sources. The general receiving module (200) can handle communication protocols and handshaking with the airborne data processing unit (12) and other systems, handle preliminary processing of received messages and provide a single interface for the ground based server (14). In one embodiment, the general receiving module (200) can reside on its own hardware platform independent of other applications running on the ground based server (14).

Once information is received by the ground station server (14) through the general receiving module (200), a data parsing and dynamic storage module (202) can be provided to parse and transform the data into other user-defined formats the data received from the data processing unit (12). The data parsing and dynamic storage module (202) can utilize a standard aircraft configuration database that describes how all the flight data and other data received from the data processing unit (12) is structured inside the files received from the data processing unit (12). The data parsing and dynamic storage module (202) may also parse the values into series of engineering parameters, applying any logical and mathematical operations to produce meaningful data in usable forms. Additionally, the data parsing and dynamic storage module (202) may be able to dynamically store data in the proper and pre-defined categories and locations based on predefined categorization.

Data parsed and categorized by the data parsing and dynamic storage module (202) can be stored in a database (209) for storage and later retrieval.

Application software (204) can reside on the ground station server (14), or on remote user workstations (16), which may then be used to generate data reports from the summary data. These reports may then be transmitted to the appropriate user (such as by an email or secure file transfer protocol (FTP(S)). The application software (204) may also contain software to schedule and create reports, validate the content of generated reports, complete and format the reports, etc. It may also contain software for error handling, security management, monitoring services, system management, etc., as are commonly known and used by those skilled in the art.

The ground station server (14) may also include a delivery module (209) which can be used to construct, format, and route messages in various different formats using various different transmission technologies (for example, emails, text messages, pre-recorded telephone calls, or the like) to third parties. The delivery module (209) can allow the ground station server (14) to transmit summary reports, emergency alerts, and other reports or notifications to third parties using various network and wireless technologies. An optional text message module (208) may be provided to configure messages in proprietary or non-standard formats, to be delivered by the delivery module (209).

In one embodiment, the delivery module (209) may also be configured to deliver instructions to alter or modify the data parameters or instruction sets residing on the airborne unit (12). A user (16) may access the application software (204) and/or previously populated data tables stored in the data base (209) through the website (212) and cause instructions stored in the database (209) to be delivered to the airborne unit (12).

The ground station server (14) may also perform the functions of a web server (212). The web server (212) can provide a web site (214) through which customer and third party interfaces can access the ground station server (14). For example, the users (16) may access data obtained by the ground station server (14) from the data processing device (12) over the internet (28) through the web site (214). Users (16) may also view various summary reports and other information through the web site (214) and perform various services. A web services module (211) may also be provided to allow customers and third party interfaces to securely pull data from the ground station server (14).

Figure 5:
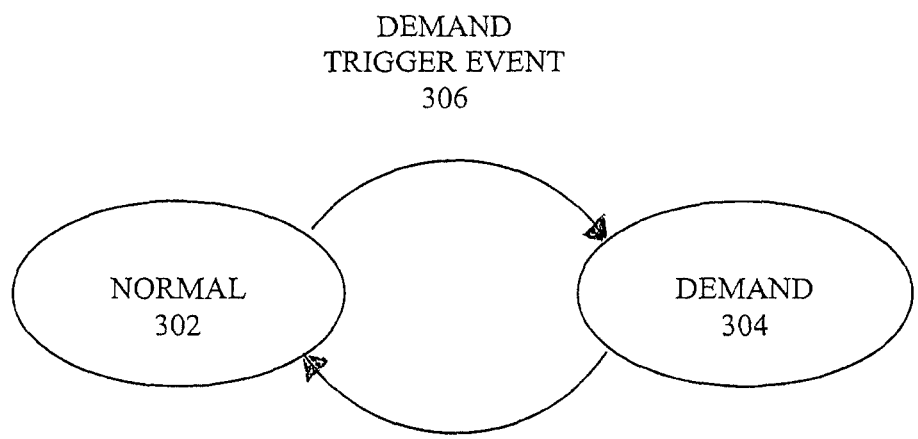
FIG. 5 is a state diagram showing two modes of operation of a data processing unit.

The data processing unit (12) is configured to operate in at least two modes. In one embodiment, FIG. 5 illustrates a state chart illustrating the different modes or states of operation of the data processing unit (12). Under normal conditions when the aircraft is not in a potential demand situation, the data processing unit (12) operates in a normal state (302). In the normal state (302), the data processing unit (12) obtains flight data and other data that the data processing unit (12) may receive from the aircraft, analyzes/interprets this flight data and stores/collects the flight data. This collected/stored flight data may be compiled into files and sent to the ground server (14) at user defined periodic intervals, or on command. When a demand triggering event (306) occurs, the data processing unit (12) can enter into a demand state (304) where its data transmission rate and intensity increases. The increase in data transmission can be the inclusion of more data, more frequent data transmission or a combination of more data and more frequent transmission. The trigger event (306) typically indicates that the aircraft (10) is in a user-defined or user-commanded demand state, or a potential emergency situation or actual emergency situation, and the data processing unit (12) can alter its operation in the demand state (304) accordingly. If the emergency situation is resolved or the demand mode operation is no longer desired by the user, a disarm trigger (308) can be used to place the data processing unit (12) back into the normal state (302).

Figure 6:
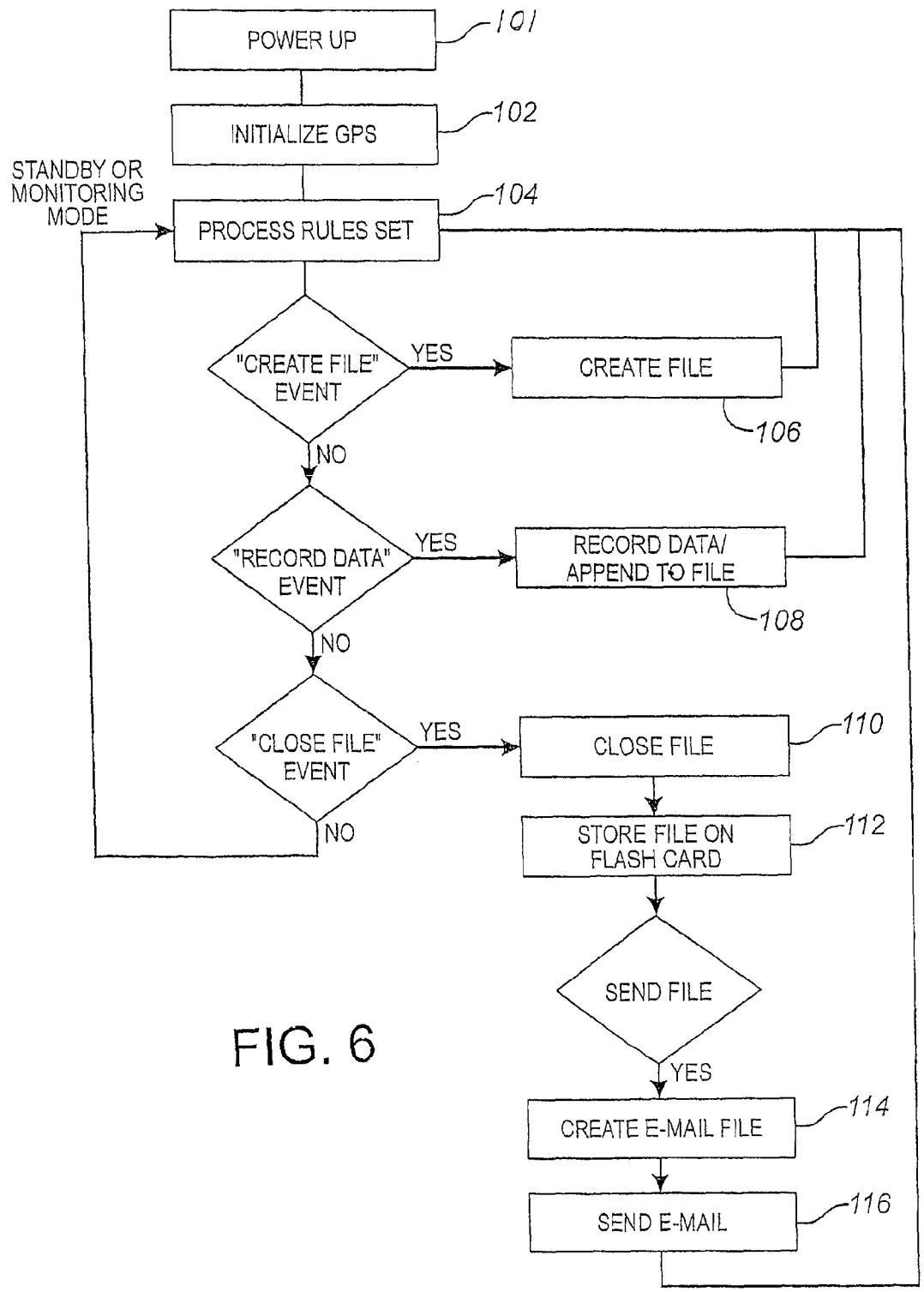
FIG. 6 is a flowchart of a method of operation of the system during a normal state.

FIG. 6 illustrates a flowchart of a method (100) implemented by the data processing unit (12) in one embodiment while it is in the normal state (302). When the data processing unit (12) powers up (101), the GPS receiver is initialized (102) and the data processing unit (12) goes into a standby/monitoring mode. In standby/monitoring mode, all inputs are being monitored (104) and compared to a rules database which is stored in non-volatile memory. The rules database defines aircraft data conditions or events which trigger certain functions of the data processing unit (12). The rules database may be stored in memory in the data storage and control module (38). The rules database may be updated by authorized ground users who can send appropriate instructions over the communication link (18) to the airborne data processing unit's (12) data processing and storage module (38); For example, an event may cause the data processing unit (12) to create a data file (106). Another event may cause the data processing unit (12) to begin recording data (108) to the newly created file or to append data to an existing file. Data files may include a flight data recorder file (FDR file) which includes all relevant flight data, or a summary file which includes only summary data of certain inputs. Another event may cause the data processing unit (12) to close the data file (110), whereupon a copy of the file may be stored on the removable memory medium (112). Yet another event may instruct the data processing unit (12) to create a summary file (114), containing a limited set of key parameters of the flight data or summary of parameters of the flight data recorded over time. The summary file may then be transmitted by email (116), either immediately or at a subsequent time through the satellite network (22) or other wireless transmission technology to the ground station server (14).

As will be apparent to one skilled in the art, the definition of the rules in the rules database enables customization of the data files to be stored and transmitted, and the summary reports which can be produced and manipulated by users. For example, the rules may be configured such that summary reports are created for flight times, block times and aircraft locations; engine start and shutdown times; engine performance data under various conditions for trend monitoring; engine performance limits and exceedance reporting; standard reports for auxiliary power unit (APU) usage (cycles and running time); APU performance data for trend monitoring; and fuel usage per engine per flight, amongst others. In addition, reports may be generated for Out, Off, On, In (OOOI) times, provide operational data used for various operational and quality assurance programs, or to monitor specific aircraft systems for user defined limits and report exceedances.

As described above, an authorized user (16) may modify the rules database or instruction sets which operate in the data processing unit (12) by sending modification instructions through the ground based server (14) to the airborne unit (14).

A "create file" event may be coincidental with the monitoring mode and may be triggered immediately upon power being applied to the unit (12). A "record data" event can be defined by the starting of the aircraft engines or another pre-flight event. A "close file" event will cause data, either in the form of a FDR file or a summary file or both, to be written to the removable memory medium or transmitted by wireless transmission. A "close file" event may be triggered by an event signaling the end of a flight such as touchdown on a runway or the shutting down of aircraft engines. Alternatively, a "close file" event may occur during a flight, either by manual selection by the aircraft crew or by ground personnel or, for example, by a set of data conditions indicating an aberrant aircraft condition. The creation and transmission of a summary file may take place at any time during a flight or at the termination of a flight, depending on the data desired.

Each of the above examples of an "event" is intended to only exemplify the application of the rules database and not to limit the possible rules and events which may be implemented in the present invention. Additionally, these events may differ from the triggering event (306) that places the data processing unit (12) in the demand state (304).

In one embodiment, a summary data file is a machine-readable file such as a binary file or a text file. The summary data file may be optionally encrypted using any suitable encryption method. Preferably, the summary file is readable only by unique software resident on the ground server (14), which provides an additional layer of security over and above the encryption of the file. The summary file preferably is limited to the aircraft identifier, selected data values from the larger flight data set, and data identifiers which may be packaged in a compact file of less than about 1 kilobyte and more preferably less than about 100 bytes. The summary file may then be incorporated into an email message, such as by attachment.

Referring again to FIG. 1, in a preferred embodiment, the data processing unit (12) includes an email client or email software which may store, send or receive emails using conventional methods over the chosen communication system. The email client may also connect with the mobile computing such that emails from the ground server (14), or from any email server connected to the ground server (14) may be relayed to the aircraft crew through the mobile computing device. Alternatively, or in addition, the data processing unit may include an SMS module to store, send or receive text messages. In this manner, advisories and other messages may be transmitted to the aircraft crew.

Using method (100), the data processing unit (120) can receive flight data from the aircraft (10), automatically analyze this flight data to generate and, periodically or on command, send summary reports, summarizing a small portion of the flight data, to the ground station server (14). Periodically can mean from time to time at a regular or irregular rate. In one embodiment, the summary reports can be sent at a first rate. This summary report can be stored in the ground station server (14) and/or transmitted, such as by email, to potentially interested personnel to inform them about relevant parameters of the aircraft (10) or notify them of parameters in the flight data that may differ from their ideal values or range of ideal values. A sample flight data report generated from data contained in an email transmission may be formatted as shown in FIG. 7. A sample engine trend data report is shown in FIG. 8. Numerous other forms and formats of data presentation may be implemented as will be obvious to those skilled in the art.

The data transmission from the data processing unit (12) is transmitted from the satellite network (22) to the satellite ground earth station (24), and routed through a gateway (26)

to the ground station server (14) over the Internet (28), a private computer network, a virtual private network (VPN) or over a public switched telephone network, as is well known in the art. In one embodiment, the entire process of capturing, processing and storing on board data, periodic or rules based data and message transmission, ground reception, recording, processing and distribution to end users, is entirely integrated and automated, requiring no human intervention, and is carried out in a relatively short period of time, for example, 15 seconds or less from end-to-end.

Referring again to FIG. 5, if the data processing unit (12) is operating in the normal state (302) and a demand trigger event (306) occurs, the data processing unit (12) will enter the demand mode (304). The demand trigger event (306) can arise from any number of conditions that can indicate that the aircraft (10) is in an abnormal state or potential emergency situation. For example, the demand trigger event (306) can be a manual activation of the demand mode (304) by a member of the crew or other person onboard the aircraft, a manual activation of the demand mode (304) by a ground user (16) who is monitoring the operation of the aircraft (10), or automatic detection of a demand criteria or potential emergency situation by the data processing unit (12) while analyzing the flight data being collected.

The demand trigger event (306) can be a manually-activated trigger onboard the aircraft (10). A member of the flight crew or other authorized person on the aircraft can initiate a demand trigger event, such as by pressing a button or activating a switch located on the flight deck or other area of the aircraft. In this manner, when a person onboard the aircraft becomes aware of a potential emergency situation occurring onboard the aircraft (10) including suspected problems with the aircraft or hijacking, even if the data processing unit (12) does not determine a potential emergency situation is occurring based on its analysis of the flight data, the manual triggering of a demand state can convert the operation of the data processing unit (12) into the demand state (304).

The demand trigger can also be a manually activated instruction arising on the ground from the ground server (14), and transmitted to the data processing unit (12) through the satellite network (22). An authorized user logged into the ground server (14), can identify the target aircraft (10) and transmit the activate demand state command to the data processing unit (12) in the aircraft (10), placing the data processing unit (12) into the demand state (304) from the ground. Similarly, in one embodiment, only an authorized person on the ground can deactivate the demand mode once it has been activated by any of the above-described means.

Alternatively, the demand state triggering event (306) could be automatically determined by the data processing unit (12) during its retrieval and analysis of the flight data being obtained from the aircraft sources (10). As the data processing unit (12) receives the flight data from the aircraft (10), it simultaneously can analyze this flight data in accordance with embedded rules stored on the airborne processing unit. If the quantitative values of any of this flight data (including combinations of parameters) falls outside a rules-based threshold or a value which indicate the aircraft (10) is in an abnormal or potential emergency state, the data processing unit (10) will treat this as a demand state triggering event (306) and the status of the data processing unit (12) will be changed to the demand state (304). In this manner, the data processing unit (12) can automatically detect a possible emergency situation based on the flight data being analyzed, without human intervention, and automatically enter the demand state (304).

These automatically detected conditions leading to initiation of the demand state can include a situation in which any parameters of the flight data being analyzed by the data processing unit (12) indicate that there is an abnormal or a potential emergency situation with the aircraft (10). For example, typical flight data parameters that might be used as an demand triggering events (306) can include: engine exhaust gas temperature (EGT) falling above or below a selected temperature for a selected period of time; an inter-turbine temperature (ITT) falling above a pre-defined temperature for a pre-defined period of time; engine low pressure rotor speed (N1) above or below a selected threshold for a selected period of time; fuel flow (FF) below a selected rate for a selected period of time; an engine pressure (EPR) above or below a selected threshold value for a selected period of time; or some other change in a parameter that can be an indication of a critical malfunction, such as an engine failure; or a sudden change of altitude, attitude, airspeed or cabin pressure. The aforementioned list merely provides examples and is not intended to be restrictive in any sense.

A parameter or change in a parameter or combination of parameters that indicates an aircraft upset or abnormal flight operation, could also be used as an automatic demand state trigger condition (306). For example, other parameters of the flight data that can be used as a demand state triggering event (306) can include: measured pitch being greater than a prescribed number of degrees or pitch rate exceeding a prescribed number of degrees per second; measure roll being greater than a prescribed number of degrees; measure yaw rate being greater than a prescribed number of degrees per second; the indicated air speed (IAS) being greater than a prescribed speed; the indicated air speed (IAS) being less than a prescribed speed; a stall warning activation; stick shaker being activated; cabin depressurization; and any abnormal value or indication in the flight data being analyzed by the data processing unit (12) possibly indicating an upset or abnormal flight state.

Continuous retrieval, analysis, interpretation and storage of the flight data by the data processing unit (12) with only periodic transmittal to the ground server (14) of a summary of what the rules embedded in the data processing unit (12) dictate for each normal and abnormal state, may be deemed sufficient by a user during normal operation of the aircraft (10). Typically, a ground crew will not require extensive flight data from the aircraft (10) during its normal operation. In the normal state (302), the data processing unit (12) continuously retrieves, analyzes and stores flight data to be compiled into a summary report of particularly relevant flight data or parameters of the flight data over time and transmit this summary report to the ground server (14) periodically at a first rate. The periodic transmission of the information and the transmission of a significantly reduced portion of the flight data can reduce the bandwidth needed from the satellite network (22) the associated costs, while still providing a sufficient amount of information to a ground crew while the aircraft is experiencing normal operating conditions. In all cases, whether in normal or demand mode, the location, altitude and airspeed of the aircraft are transmitted.

However, in a potential or confirmed emergency situation with an aircraft, or for other reasons that may be determined by ground or flight personnel, it is often crucial for the ground crew to have as much of the flight data available as soon as possible. In a situation in which an aircraft is in an abnormal state and/or the flight crew is having difficulties with the aircraft function or control, this data, if made available in a timely manner, can provide personnel on the ground with valuable insights that can either be relayed to the crew or, in the case of an accident, can provide valuable information related to the location of the aircraft and illuminate the events leading up to the crash. This capability allows the ground crew to be proactively alerted to a potential emergency situation occurring with the aircraft. It can also allow them to receive a more complete set of the flight data from the aircraft during an abnormal or potential emergency situation, when bandwidth and the cost to transmit the data is not a concern, and receive this flight data from the aircraft continuously when required. Other non-emergency reasons for crews to initiate the demand state may include in-flight troubleshooting, monitoring of training flights while in progress, or evaluating alternate flight profiles into or out of specific airports.

Therefore, when in the demand state, the airborne unit (12) operates to increase the frequency of data transmission, or the amount of data being transmitted, or both, in order to increase the overall intensity of data transmission.

With a demand state triggering event (306) occurring and the data processing unit (12) operating in a demand mode (304), the data processing unit (12) can collect and transmit as much flight data recorder data as possible to the ground station server (14). Unlike the operation of the data processing unit (12) in the normal state (302), in the demand state (304), the data processing unit (12) may not analyze/interpret any of the flight data or other data it may obtain from the aircraft, but rather may simply gather as much of the obtained information as possible and transmit it to the ground station server (14). In a preferred embodiment, the GPS location, altitude, and airspeed of the aircraft are always transmitted.

Figure 9:
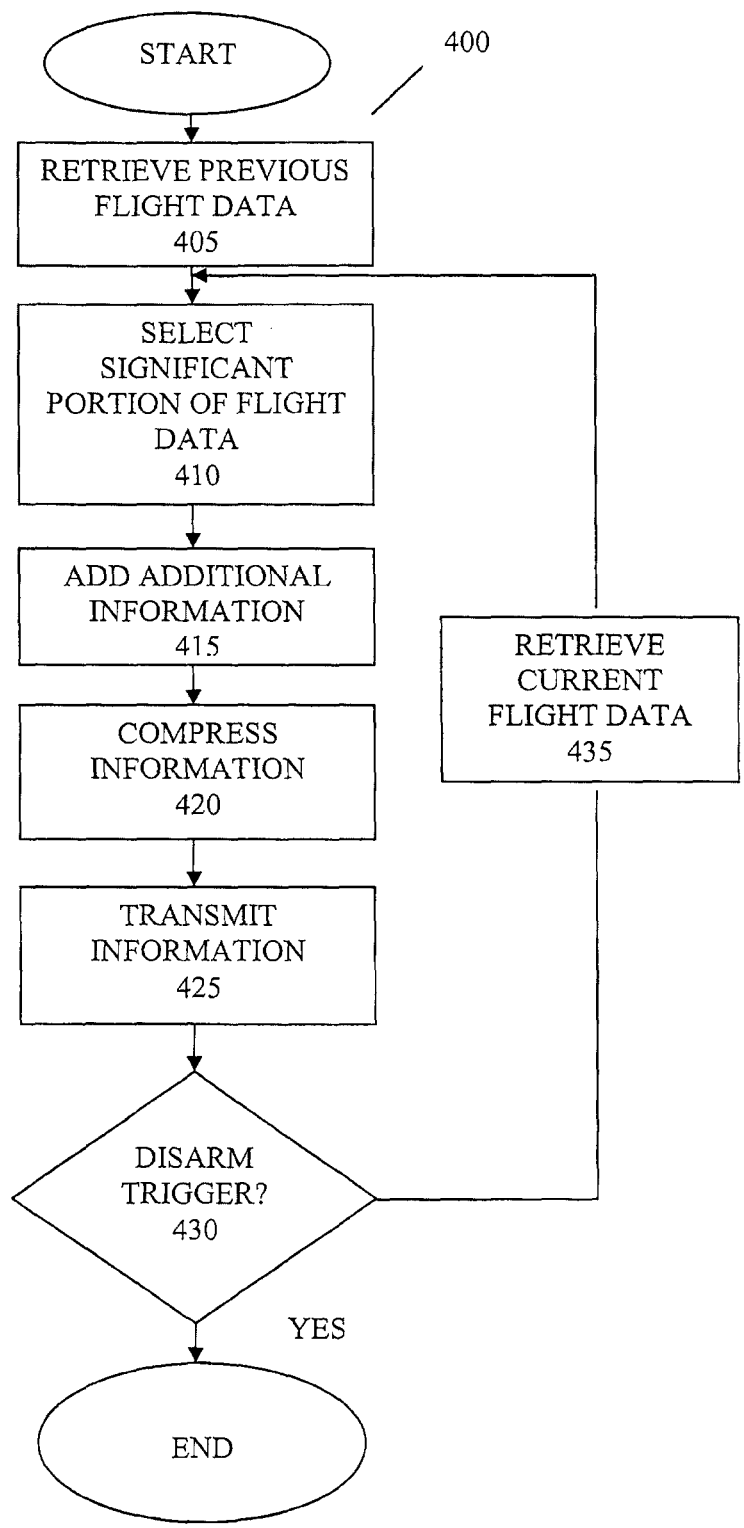
FIG. 9 is a flowchart of a method of operation of the system during a demand state.

FIG. 9 illustrates a flowchart of a method (400) that can be performed by the data processing unit (12) to collect and transmit information to a ground station server (14) while the data processing unit (12) is in the demand state (304) during an abnormal or potential emergency situation.

In one embodiment, the method (405) can start at step (402) where the data processing unit (12) will gather flight data that was collected and stored for a predetermined time before the trigger event (306) occurred that caused the data processing unit (12) to enter into the demand state (304). This ability to recover and transmit data that was recorded prior to a triggering event may be very valuable for analysis. The data associated with the time period immediately preceding the triggering event (the "preview window") is referred to herein as the "preview data". In one embodiment, the preview data is stored in a volatile buffer memory, or non-volatile memory, or a combination thereof.

In one embodiment, all flight data is recorded from the start of the current session, thus allowing for any data recorded during the flight prior to the time at which the demand mode was triggered to be transmitted off the aircraft. The length of the preview window can be any desirable and practical amount of time, such as, for example, 30 minutes immediately preceding the demand state trigger. The preview data can include the same data that is sent by data processing unit (12) during the demand state (304) so that ground personnel will not only have more detailed data after the demand trigger event (306) occurs, but they will also receive the same data for the predetermined preview time before the onset of the demand state (304). The preview data allows analysis of this data to determine the events that led up to the abnormal or emergency situation. By transmitting this preview data, the actual abnormal state or emergency itself can be analyzed as the flight transitioned from relatively normal operation to the abnormal state. The data that is captured before the demand state triggering event (306) occurs will ideally be sufficient to establish the pre-emergency state of the aircraft and ideally will be sufficient to accurately describe the transition from normal operation to the demand state. Step 407 can be performed whether the demand triggering event (306) is a manual or automatic trigger.

At step (410), any subset of the collected flight data can be selected. The flight data retrieved from the aircraft (10) by the data processing unit (12) can in some cases contain too much information to be transmitted to the ground station server (14) through a current satellite network because of limitations to bandwidth or where the network coverage may not be truly global. In the case of a limited bandwidth network, a significant subset of the total flight data retrieved from the aircraft (10) can be selected for transmittal to the ground station server (14). This subset of the total flight data can be the most representative data for the purposes of post flight analysis that can be transmitted through the satellite network (22). Preferably, in all cases, the GPS location, altitude, and airspeed of the aircraft are transmitted.

At step (420) the method (400) can pack and compress the flight data and any additional information added. In one embodiment, the data may be packed in the sense that it is configured to be expressed in a minimal volume while still maintaining accuracy and avoiding ambiguity. In order to achieve such efficiency, the ground station and data processing unit must be pre-programmed to recognize the sequence of data and messages characters without requiring explanatory characters associated with each message or part thereof. This technique differs from conventional and generally accepted data transmission procedures and equipment, such as the widely used ACARS (Aircraft Communications And Recording System), which configure messages with significant "overhead" that is attached to each transmission, this requiring significant additional bandwidth and associated cost. For example, engine turbine speed, typically measured as a % rpm value, is one of the parameters recorded in a typical FDR file that is transmitted off the aircraft. Using existing transmission protocols such as ACARS, this would normally be encoded and transmitted as "Engine 1 N1: 102%" in an ASCII data format, requiring 17 bytes (136 bits) to transmit. Data packing as described herein allows the identical value to be transmitted using as few as 7 bits (binary digits). In one embodiment, the data is packed to remove the message overhead "Engine 1 N1" and "%", to express the data value "102" alone. Thus, using the method described herein the value 102 could be expressed in 7 bits, an improvement in efficiency of more than 50%. Using pre-programmed protocols that synchronize the communications between the airborne unit (12) and the ground station (14), the identity of the value (ie. engine turbine speed) will be recognizable to the ground based server because of its position in the data file which is transmitted.

In one embodiment, when the airborne unit (12) is operating in demand mode, it uses a packing method for each and every parameter or subset of parameters in the FDR file to be transmitted. Parameter by parameter, the raw data from the aircraft is packed as tightly as possible using the minimum number of bits to transmit the data with no loss of accuracy or integrity. The result of this data packing is a binary file that would appear to be completely random to a ground station or server (14) unless the instructions for packing the data are used in reverse to decode the parameters.

Thus, the receiving system, which is in one embodiment the ground based server (14), must understand and recognize the method of data packing in order to unpack or decode the binary data file. No commenting or formatting information needs to be transmitted if the receiving system is programmed to recognize the format and content that it is receiving. In one embodiment, a single header of the binary data file will identify the format and content of the packed data.

The packed data file may then be further compressed using conventional data compression techniques well known to those skilled in the art, prior to transmission off the aircraft.

By packing and then compressing this information in the data processing unit (12) before the information is transmitted to the ground station server (14), the amount of information transmitted can be increased without increasing bandwidth requirements. If combined with more frequent data transmissions, the total amount of data being transmitted can be substantially increased when the unit (12) is in the demand state. For example, using the currently available Iridium™ data transmission link, the bandwidth is limited to 2400 Bit per second. Using the packing and compression method described herein, the processing unit in connection with a ground station (14) pre-programmed as described above, approximately 240 parameters from a FDR along with a four dimensional GPS file can be transmitted continuously during a demand state over Iridium whereas, using conventional methods that do not pack data, the number of comparable parameters would be limited to 30-40 parameters per communication channel.

With the data packed and compressed at step (420), the data can be transmitted to the ground station server (14) at step (425). Referring to FIG. 1, the data can be transmitted from the data processing unit (12) through its communications module (36) to a satellite network (22). From the satellite network (22) the data can then be transmitted to the ground satellite receiver (24), through the linked gateway (26) and to the ground station server (14) over the internet (28) or other network.

In one embodiment, for example, the satellite network (22) can be the Iridium™ satellite network and the data can be transmitted at step (425) in the short burst format (SBD) offered by Iridium™ and/or through a direct dialup connection with the Iridium™ satellite network or through an alternate wide band channel if it is available. The SBD transmission format can be used to transmit packets of data at selected intervals (e.g. 20 seconds) while the direct dialup connection can be initiated and the data transmitted directly from the data processing unit (12). In one embodiment, multiple transmission types could be used concurrently to increase the amount of data that can be transmitted to the ground server station (14) such as SBD transmission occurring simultaneously with direct dialup connections.

After the method (400) has reached step (430) and the data processing unit (12) has not received a disarm trigger (430), the method (400) can move onto step (435) and retrieve the current flight data which the data processing unit (12) is obtaining from the aircraft (10). Steps (410), (415), (420) and (425) can then be repeated over and over again, obtaining current flight data, adding additional information to the flight data, compressing the data and transmitting this current flight data to the ground station server (14) until a disarm trigger (308) is received by the data processing unit (12). In this manner, the remote server (14) can be repeatedly receiving updated flight data and additional data indicating the aircraft's position while the data processing unit (12) is in the demand state (304) and the aircraft (10) is in a potential emergency situation. In one aspect, method (400) can be repeatedly performed at a second rate, so that flight data is periodically obtained and transmitted to the ground station server (14) at the second rate. In one embodiment, the second rate will be faster than the first rate that information is periodically transmitted to the ground station server (14) while the data processing unit (10) is in the normal state (302).

Figure 10:
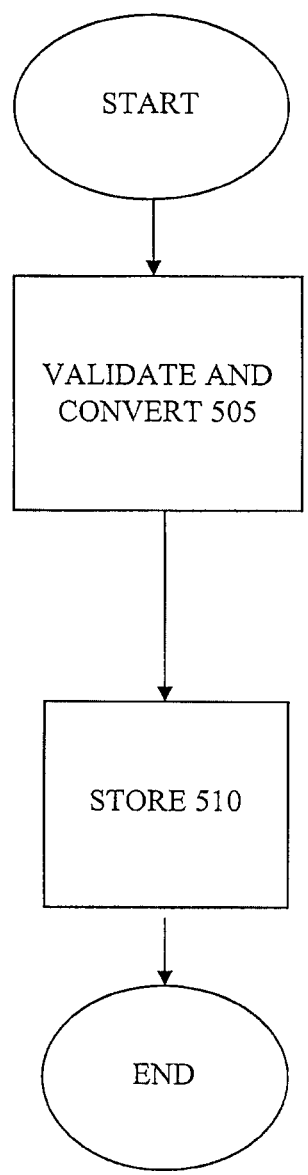
FIG. 10 is a flowchart of a method of the operation of a ground station server after receiving flight data during a demand state situation.

FIG. 10 illustrates a flowchart of a method (500) for the remote server (14) to collect and recompile the received information from the aircraft (10) to recreate the flight data recorder and other flight data or partially recreate the flight data recorder and other flight data.

At step (505) the received information is validated, and converted by the ground station server (14) into the original flight data recorder format or other prescribed formats by the ground station server (14). If the data file has been packed, the data can then be unpacked or decoded to produce a data file which restores the information which was removed during the packing process.

At step (510) the received information can be stored at the remote server (14). If desired, the flight data recorder data can be stored in multiple formats. For example, in one embodiment the data can be stored in three different formats: the individual data transmissions received from the aircraft over the satellite network (22) can be archived in their raw format (compressed and unprocessed) as they were received from the data processing unit (12); the data from the raw packets can be converted to engineering units and stored; and a flight data recorder mirror file can be recreated from the information received from the data processing unit (12) containing the flight data or a large portion of the flight data stored in the flight data recorder onboard the aircraft (10). The flight data recorder mirror file is meant to mirror the flight data stored in the flight data recorder of the aircraft with the result that flight data recorder data can be stored in the flight data recorder and a copy of this data or a copy of a large portion of this data can be stored on the ground, such as at the ground station server (14). Should any loss of or damage occur to the flight data recorder in the aircraft, the flight data recorder file created by the ground station server (14) can be used for analysis and investigation of the operation of the aircraft (10) during or after the potential emergency situation.

In one aspect, all of the data received by the ground station server (14) and further processed, such as the flight data recorder mirror file, can be stored at step (510) in two separate ground locations for redundancy.

The ground station server (14) can also provide automatic third party notifications when it receives a transmission from the data processing unit (12) that the aircraft (10) is in a potential emergency situation. Various notifications to various individuals can be triggered, indicating to these individuals that the aircraft (10) has entered a demand state or potential emergency situation. These notifications may take many formats, such as emails to selected personnel, feeds to other software applications such as aircraft situational display (ASD) applications, or automated telephone calls, text messages or other messages to select personnel.

These automatic notifications can be sent as soon as the ground station server (14) receives the first data transmission from the data processing unit (12) indicating that it has entered the demand state (304). Additionally or alternatively, these notifications could also be sent periodically to keep the designated recipients apprised of the situation and/or when a potentially relevant change occurs in the parameters of the flight data.

Additionally, any interfaces regarding the aircraft (10) that are accessed from the ground, such as through the ground station server (14) (e.g., such as web pages accessed by the customer through the web site (214), etc.) can clearly indicate the current status of the aircraft (10).

In the event that a potential emergency situation passes, the data processing unit (12) can be sent a disarm trigger (308) from an authorized user of the ground station (14). In this manner, the aircraft (10) can resume its normal operation and the disarm trigger (308) can be transmitted to the data processing unit (12) to switch it back to normal operation.

The disarm trigger (308) will revert the data processing unit (12) back to its normal state (302) causing it to collect and analyze the flight data, periodically transmitting a summary report summarizing some key parameters of the flight data to the ground station server (14). An authorized user can log into the ground station server (14) and initiate the transmittal of the disarm trigger (308) to the data processing unit (12).

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claim.

The invention claimed is:

1. A method of transmitting flight data from an aircraft to a ground station server using an airborne data processing unit comprising data tables and instruction sets, the method comprising:
   (a) during operation in a normal state;
      (i) obtaining and analyzing flight data from a plurality of aircraft data sources;
      (ii) periodically generating and transmitting a summary file containing a summary of flight data to the ground station server;
      (iii) detecting a pre-defined emergency or non-emergency triggering event by continuously and quantitatively analyzing flight data to determine if a data parameter is outside a user-defined range; and
   (b) in response to a pre-defined emergency triggering event, entering a demand state and collecting and transmitting as much flight data recorder data as possible to the ground station server, wherein the rate of data transmission is greater than in the normal state, and wherein the flight data recorder data is not analyzed, but rather simply gathered for transmission;
   (c) in response to a pre-defined potential emergency or non-emergency triggering event, entering a demand state and creating a flight data file containing data in addition to that transmitted in the normal state and transmitting the flight data file to the ground station server at a greater rate than in the normal state, and wherein the flight data file comprises an aircraft identifier, a date and time, a GPS location, an altitude, and an airspeed, and at least one other flight data relevant to the potential emergency or non-emergency triggering event; and
   (d) reverting back to the normal state upon the occurrence of a disarm trigger.

2. The method of claim 1 wherein the flight data is packed or compressed prior to transmission during the demand state.

3. The method of claim 1 further comprising the step of storing preview flight data from a user-defined period of time before the triggering event, and transmitting the preview flight data to the ground station server during the demand state.

4. The method of claim 1 wherein the pre-defined triggering event further comprises a user command.

5. The method of claim 1 further comprising the step of revising the data tables or instructions sets, either before or after a triggering event, to modify either parameters of the flight data to be obtained from the aircraft, or the logic of collecting and transmitting the flight data, based on modification instructions received from a ground station.

6. The method of claim 1 wherein the flight data recorder files are transmitted more frequently, or the amount of data in a flight data recorder file is greater, or both, during the demand state than during the normal state.

7. The method of claim 1 wherein the flight data being transmitted in the demand state is packed and compressed prior to transmittal.

8. The method of claim 7 wherein the flight data is packed in the flight data recorder file in accordance with a pre-programmed protocol that encodes and arranges the flight data without commenting or formatting information in the data file, such that the identity of the flight data is decodable by the ground station server based on the encoded position of the flight data within the flight data recorder file.

9. The method of claim 1 wherein all steps are automated.

10. A computer readable memory having thereon statements and instructions for execution by a data processing unit to carry out the method of any one of claims 1 to 9.

11. An aircraft data transmission system for transmitting data to a ground server station, the system comprising an airborne data processing unit having:
   (a) a data acquisition module operative to obtain flight data from an aircraft;
   (b) a communication module operative to transmit data to the ground server station;
   (c) a memory comprising data tables and instruction sets;
   (d) a processing unit operatively connected to the data acquisition module, the communication module and the memory and operative in accordance with the instruction sets to:
      i. while in a normal state: obtain, analyze and store flight data from a plurality of aircraft data sources; periodically generate and transmit, using the communications module, a summary file containing a summary of the flight data to the ground station server; and detect a pre-defined emergency or non-emergency triggering event by continuously and quantitatively analyzing flight data to determine if a data parameter is outside a user-defined range; and
      ii. in response to a pre-defined emergency triggering event, entering a demand state and collecting and transmitting as much flight data recorder data as possible to the ground station server, wherein the rate of data transmission is greater than in the normal state, and wherein the flight data recorder data is not analyzed, but rather simply gathered for transmission; and iii. in response to a pre-defined potential emergency or non-emergency triggering event, entering a demand state and periodically creating a flight data file containing data in addition to that transmitted in the normal state and transmitting the flight data file to the ground station server at a greater rate than in the normal state, and wherein the flight data file comprises an aircraft identifier, a date and time, a GPS location, an altitude, and an airspeed, and at least one other flight data relevant to the potential emergency or non-emergency triggering event.

12. The system of claim 11 wherein data transmissions are transmitted more frequently or the amount of data transmitted is greater, or both, during the demand state than during the normal state.

13. The system of claim 11 wherein the processing unit is operative to pack data during the demand state in a data file format which may be decoded by a pre-programmed user system.

14. The system of claim 13 wherein the processing unit is operative to pack data in the flight data recorder file in accordance with a pre-programmed protocol that encodes and arranges the flight data without commenting or formatting information in the data file, such that the identity of the flight data is decodable by the ground station server based on the encoded position of the flight data within the data file.

15. The system of claim 11 further comprising a ground station server operative to receive data transmissions from the data processing unit and upon receiving a data transmission from the data processing unit in the demand state, and if necessary decode the data transmission, and send a notification or a second data file, or both a notification and a second data file, to at least one user.

16. The system of claim 11 wherein the airborne data processing unit is fully automated.

17. The system of claim 11 wherein parameters of the flight data to be obtained from the aircraft, or the logic of collecting and transmitting the flight data of the data tables and instruction sets of the airborne data processing unit are modifiable by modification instructions sent from the ground server station.

* * * * *